United States Patent
Hall

Patent Number: 5,561,951
Date of Patent: Oct. 8, 1996

[54] LIGHTWEIGHT GLAZINGS

[75] Inventor: Christopher W. G. Hall, Redditch, United Kingdom

[73] Assignee: Pilkington Aerospace Limited, United Kingdom

[21] Appl. No.: 373,459

[22] Filed: Jan. 17, 1995

Related U.S. Application Data

[63] Continuation of Ser. No. 871,653, Apr. 21, 1992, abandoned.

[30] Foreign Application Priority Data

Apr. 23, 1991 [GB] United Kingdom ............ 9108672

[51] Int. Cl.$^6$ .................. B60J 1/00; B32B 17/10; B32B 27/40
[52] U.S. Cl. .......... 52/171.1; 52/204.5; 52/786.12; 156/99; 428/425.6
[58] Field of Search .............. 156/99, 106; 428/425.6; 52/171.1, 171.2, 171.3, 204.5, 786.11, 786.12

[56] References Cited

U.S. PATENT DOCUMENTS

| | | | |
|---|---|---|---|
| 3,808,077 | 4/1974 | Rieser et al. | 156/99 |
| 3,979,548 | 9/1976 | Schafer et al. | 428/425 |
| 4,232,080 | 11/1980 | Orain et al. | 156/99 X |
| 4,241,140 | 12/1980 | Ammons | 156/106 |
| 4,584,229 | 4/1986 | Bourelier et al. | 428/425.6 X |
| 4,584,244 | 4/1986 | Kuga et al. | 428/425.6 |
| 4,592,947 | 6/1986 | Hunter et al. | 156/106 |
| 4,643,944 | 2/1987 | Agethen et al. | 428/349 |
| 4,666,758 | 5/1987 | Hunter | 156/106 |
| 4,784,916 | 11/1988 | Bravet et al. | 428/425.6 X |
| 4,817,347 | 4/1989 | Hand et al. | 428/425.6 X |
| 4,944,822 | 7/1990 | Ishikawa et al. | 156/212 |
| 4,985,099 | 1/1991 | Mertens et al. | 52/786.11 X |
| 5,376,443 | 12/1994 | Sijan et al. | 428/425.6 X |

FOREIGN PATENT DOCUMENTS

| | | |
|---|---|---|
| 0043073 | 1/1982 | European Pat. Off. . |
| 0132198 | 1/1985 | European Pat. Off. . |
| 0157645 | 10/1985 | European Pat. Off. . |
| 0190700 | 8/1986 | European Pat. Off. . |
| 0304898 | 3/1989 | European Pat. Off. . |
| 0320871 | 6/1989 | European Pat. Off. . |
| 2443488 | 7/1980 | France ................. 156/106 |
| 1576394 | 10/1980 | United Kingdom . |

*Primary Examiner*—Carl D. Friedman
*Assistant Examiner*—Laura A. Saladino
*Attorney, Agent, or Firm*—Burns, Doane, Swecker & Mathis, L.L.P.

[57] ABSTRACT

A lightweight impact resistant window comprising a glass ply, an energy absorbing plastics interlayer and a ply of thermoset polyurethane having a Shore hardness of at least 75D, wherein the combined thickness of energy absorbing interlayer and thermoset polyurethane ply is at least 1.0 mm.

14 Claims, 1 Drawing Sheet

LIGHTWEIGHT GLAZINGS

This application is a continuation of application Ser. No. 07/871,653, filed Apr. 21, 1992, now abandoned.

BACKGROUND TO THE INVENTION

The invention relates to glazings, and in particular to lightweight glazings having a high impact resistance.

DESCRIPTION OF THE PRIOR ART

Such glazings are required for unpressurised aircraft, especially helicopters, where the light weight is obviously desirable, and resistance to bird impact is also important. They are also in demand for motor vehicles for the security forces, especially police forces, when bullet resistance (which requires a heavier construction) is not considered necessary, but an increased resistance to manual attack, for example attack with a hammer or pick-axe handle, is desirable; glazings designed to resist such manual attack are hereinafter referred to as anti-vandal glazings.

Impact resistant glazings may be produced by laminating two panes of glass with an interlayer of energy absorbing plastics material, for example polyvinylbutyral or thermoplastic polyurethane, between the panes. However, the drive for lighter weight and increased impact resistance, together with the wish to avoid dangerous spall from the face opposite the face receiving the impact, has led the designers of high performance products, especially aircraft windows, to substitute the inner glass pane with a pane of rigid plastics, especially a polycarbonate of acrylic pane. Unfortunately such panes suffer from the disadvantage of being mope susceptible to scratching than glass and more prone to thermal distortion in the finished laminate; as the ratio of plastics thickness to glass thickness approaches 1:1, the laminates will tend to warp and distort due to wide differences in thermal expansion between the rigid plastics and the glass, and the high deflection temperatures of the rigid plastics.

It has been proposed, in the production of automotive windscreens, to produce a so-called "bilayer" product in which an inner plastics component is bonded to an outer glass ply. The plastics component generally comprises at least two plies, an energy absorbing interlayer, typically of polyvinylbutyral or thermoplastic polyurethane, and a protective inner layer, which may be a soft resilient thermoset polyurethane with self-healing properties, which rapidly and spontaneously returns to its undeformed state when an abrading force is removed. Such windscreens are described in, for example, UK patent specifications GB 1 394 271 and GB 1 576 394. It has also been proposed to use such self healing polyurethane coatings on acrylic and polycarbonate panes to overcome the scratching problem referred to above. However, this is not universally popular in the marketplace and there is a preference for a hard surface, like that of glass, to facilitate cleaning.

EP 0 229 326A relates to "lightweight aircraft transparencies and, in particular, to an antilacerative shield for an impact resistant aircraft windshield" and proposes a structure comprising a glass ply; a moisture resistant, thermally stable interlayer bonded to said glass ply; and an environmentally stable innerlayer bonded to said interlayer. The interlayer is preferably a polyether urethane; polyether urethane is said to have a poor resistance to ultra violet radiation, and the specification proposes the use of an inner layer with greater resistance to ultra violet radiation and polycaprolactone urethane is preferred. The application as published does not state whether the preferred polyurethane layers (the interlayer and the innerlayer) are thermoplastic or thermoset, or give any indication of the degree of cross linking which would enable appropriate deductions to be made. However, the fact that the laminate may be assembled from glass, the polyurethane interlayer and the polyurethane inner layer by autoclaving under vacuum in a laminating bag suggests that at least the interlayer may be thermoplastic. Moreover, during examination, the applicants have limited their claims to specify that neither the interlayer nor the innerlayer is crosslinked, suggesting that they are both thermoplastic. The only teaching as to the thickness of the layers is in the example, which employs interlayer and innerlayer which are each 0.025" (that is, 0.635 mm) thick).

EP 0 320 871 relates to safety glass windshields and seems to be particularly concerned with automotive windshields; it acknowledges the problem of concussive injuries which may arise from the use of thermoset polymer films, but notes that thermoplastic films may be liable to deterioration of optical quality as a result of scratching. It proposes, as an invention, the use of an abrasion resistant branched polyurethane film prepared by the reaction of an isocyanate-terminated prepolymer and a linear polyol as a protective coating for the exposed surface of a bilayer safety glass laminate.

The branched polyurethane film may be produced by casting on a glass surface, in a mould, typically to provide a dry film 0.21 to 0.35 mm thick. Such thicknesses are preferred to prevent damage in peeling the film from the glass and in handling the film for lamination, although much thinner films are said to be sufficient to provide solvent/abrasion resistance. The film is then used to protect the exposed surface of a conventional elastomeric energy absorbing interlayer, which is preferably polyurethane, bonded to a glass ply. Alternatively the film can be formed directly on the interlayer by spraying a suitable reaction mixture on to the exposed face of the elastomeric interlayer; such films applied by spraying preferably have a thickness in the range 0.01 to 0.05 mm. It is clear, from the small film thickness preferred, that the branched polyurethane film is being used to provide abrasion and solvent resistance and not as a structural component of the windscreen.

None of these prior art proposals provide a structure suitable for use as an aircraft windshield or anti vandal window with a hard plastics surface analagous to that of glass. There is a demand in the marketplace for such a product which in addition to having the properties listed above, should be thermally stable over the range of temperature in which it will be subject in use, and substantially free from thermal stresses and distortion resulting from the manufacturing process.

SUMMARY OF THE INVENTION

According to the present invention, there is provided a lightweight impact resistant window comprising a glass ply, an energy absorbing plastics interlayer and a ply of thermoset polyurethane having a Shore hardness of at least 75D, wherein the combined thickness of energy absorbing interlayer and thermoset polyurethane ply is at least 1.0 mm.

For the aircraft windscreen and anti vandal applications envisaged herein the combined thickness of energy absorbing interlayer and thermoset polyurethane ply will normally be at least 1.5 mm. For an aircraft windshield, the combined thickness is preferably in the range 2 mm to 6 mm, while the combined thickness for an anti vandal window will normally be in the range 1.5 mm to 5.5 mm, although greater thicknesses may be used especially if weight and cost are not critical factors.

The energy absorbing plastic interlayer may be, for example, of polyvinylbutyral or thermoplastic polyurethane. It is preferred to use a polyurethane which maintains its impact resistance over a wider range of temperature than polyvinylbutyral. It is preferred to use an aliphatic polyurethane, since aliphatic polyurethanes have better light resistance than aromatic polyurethanes. The thickness of the interlayer used will depend on the impact resistance required in the product, the thicknesses of the other plies and the acceptable overall thickness and cost. For the main applications envisaged, a thickness of at least 1 mm will usually be required, while thicknesses above 4 mm will generally be unnecessary and unduly costly. However, for increased bird impact performance (eg a 4 kilogram bird impacting on a large window at 170 knots), a greater thickness eg 6 mm, may be required.

The thermoset polyurethane preferably has a Shore hardness of at least 78D, and will normally have a Shore hardness below 90D. Production of such hard polymers will generally require a substantial degree of cross linking, and preferred polymers have an average molecular weight between branch points in the range 500 to 1000, especially 600 to 900.

Particularly preferred thermoset polyurethanes for use in the practice of the present invention are prepared from a cycloaliphatic diisocyanate, a polycaprolactone diol and a polycaprolactone triol. The cycloaliphatic diisocyanate is preferably 4,4' methylene-bis-(cyclohexylisocyanate), commercially available under the trade mark DESMODUR W. The polycaprolactone diol preferably has an average molecular weight in the range about 500 to about 700 to produce a polyurethane with the required resilience. The polycaprolactone triol preferably has a molecular weight in the range about 250 to about 400 in order to provide the required cross-link density.

The thermoset polymers may be produced by "one-shot" reaction systems, although it is preferred to produce an isocyanate rich prepolymer by reacting a diisocyanate with half the total amount of diol, and then react that prepolymer with the triol and the remaining diol. This route is preferred, as it takes advantage of the greater miscibility of the diol (than the triol) with the isocyanate, and reduces the risk of optical aberrations in the finished product.

The thermoset polyurethane preferably has a low heat deflection temperature, measured in accordance with ASTM 648, of less than 60° C., and preferably less than 50° C. Such thermosets with a low heat deflection temperature will not give rise to significant bending stresses, resulting from differential thermal expansion of the laminate, until well below normal UK ambient temperature (about 23° C.), so that windows according to the invention produced using them will be virtually free from warpage and distortion even when the ratio of glass ply thickness to thermoset polyurethane ply thickness approaches 1:1.

At around such ambient temperatures, the preferred thermoset polyurethanes exhibit similar surface hardness to those of conventional rigid plastics, such as polycarbonates and acrylics. In addition, they have a greater resistance to scratching. Moreover, if they are scratched, the damage will, provided they have not been cut, self-heal after several days at normal UK ambient temperatures, and such healing can, if necessary, be accelerated by heating to 35° C. to 40° C. when the recovery time will be substantially reduced, in some cases to seconds.

The thermoset polyurethane will normally have a thickness of at least 0.5 mm and preferably at least about 1 mm. An important advantage of using thicker layers is that the thicker the layer, the more it protects the underlying thermoplastic layer from damage (from which it would not be capable of recovering).

DETAILED DESCRIPTION OF THE PREFERRED EMBODIMENT

Figure 1:
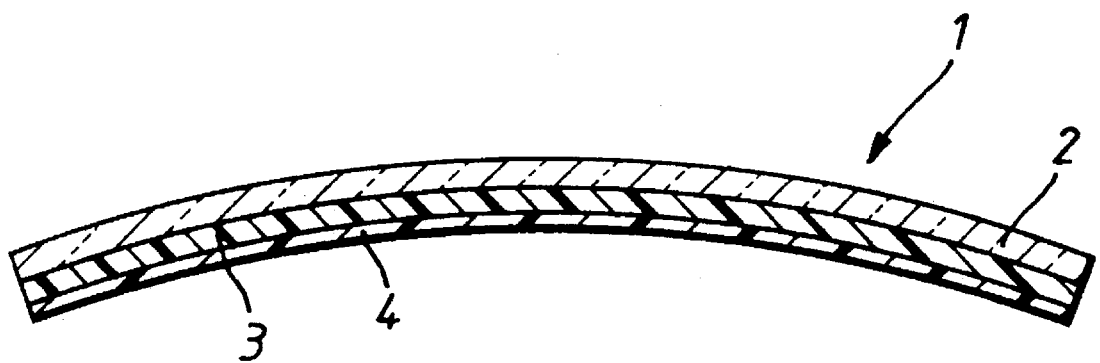
FIG. 1 is a cross-section through a window in accordance with an embodiment of the invention.

FIG. 1 shows, by way of example, a window, generally designated 1, of one embodiment of the invention which comprises a front glass ply 2, an energy absorbing plastics interlayer 3 and a rear ply of rigid thermoset polyurethane 4.

In a preferred design for a helicopter window, a front glass ply 2 is of chemically toughened glass having a thickness in the range 2 to 4 mm, for example 3 mm, the interlayer 3 is of a thermoplastic polyurethane having a thickness in the range 1.5 to 4 mm, for example 2.5 mm, and a thermoset polyurethane rear ply 4 has a thickness in the range 0.5 to 2.5 mm, for example 1 mm.

In a preferred design for an anti-vandal window, a front glass ply 2 is of annealed glass having a thickness in the range 2 to 4 mm, for example 3 mm, the interlayer 3 is of a thermoplastics polyurethane having a thickness in the range 1 to 3 mm, for example 1.25 mm, and a thermoset polyurethane rear ply 4 has a thickness in the range 0.5 mm to 2.5 mm, for example 1 mm.

The glass ply used in the windows of the present invention will usually have a thickness of at least 2 mm (to provide additional rigidity) but not more than 4 mm in order to achieve a lightweight product. The glass ply may be annealed, or chemically or thermally toughened, depending on the properties required and cost considerations.

Moreover, while the invention may be used for producing curved windows, as shown in the drawing, it may equally be used for producing flat windows as described in the following non-limiting Examples.

EXAMPLE 1

A thermoset polyurethane ply was prepared by the following procedure. Three equivalents of 4'4' methylene-bis (cyclohexylisocyanate)—available in commerce under the trade mark DESMODUR W—were mixed with one equivalent of a polycaprolactone diol having an average molecular weight of about 550—commercially available as CAPA 200—and 0.002% by weight, based on the weight of isocyanate plus diol, of dibutyltin dilaurate, and the mixture heated at 80° C. for two hours. The isocyanate rich product was then mixed with 2 equivalents of polycaprolactone triol having an average molecular weight of about 300—commercially available as TONE 0301—in a dispenser equipped with synchronised piston pumps and rotary mixer.

The reaction mixture from the dispenser was cast between parallel spaced glass plattens 1 mm apart, in known manner and cured to form a solid rigid thermoset pane having the following properties:

Shore hardness at 23° C. : 79D
Heat distortion temperature at 264 lbs loading (ASTM 648) : 38° C.
Taber abrasion. Change in haze after 100 cycles (ASTM D1044)
at 23° C. : <3%
at 50° C. : <1%
Sheen scratch test. Time to recover with 1000 g loading on stylus (British Standard 3900E2)
at 23° C. : 48 hours
at 50° C. : <60 seconds and an average molecular weight between branch points of 874.

An anti-vandal window was made up using an interlayer of thermoplastic polyurethane to bond a 1 mm thick thermoset polyurethane ply produced as described above to a front ply of annealed float glass 3 mm thick. The inner surface of the glass ply was primed with an aminosilane adhesion promoter and an assembly made up of the glass ply, an interlayer of thermoplastic polyether urethane 1.25 mm thick (available in commerce from Morton International Inc of Chicago, USA as PE193) the thermoset ply produced as above, and a flat molding plate coated with a surface release agent. The assembly was placed in a laminating bag which was evacuated and then heated in an autoclave at 125° C. and 6 bar pressure. After lamination and cooling, the resultant window was removed from the laminating bag and found to be flat and easily mounted in a testing fixture. On testing, the laminate resisted the impact (i e was not penetrated) of a 2.25 Kg ball dropped from a height of 10 meters on the glass front face of the window without any spall from the rear face.

A second similar laminate resisted 20 blows with a 250 g hammer on the glass front face without penetration or spall from the plastics rear face.

EXAMPLE 2

The procedure of Example 1 was repeated except that the thickness of the thermoplastics interlayer was increased to 2.5 mm. Again, the laminate was flat after autoclaving and easily fitted into the test fixture. The laminate resisted five consecutive impacts from a 2.25 Kg ball dropped from a height of 10 meters without penetration.

EXAMPLE 3

The procedure of Example 2 was repeated using a front ply of 3 mm chemically toughened glass in place of the annealed glass used in Example 1. The laminate remained flat after autoclaving.

The laminate resisted the impact of a 1 Kg bird at 150 knots without spall from the inner plastics face.

EXAMPLE 4

Example 1 was repeated, except that the formulation of the thermoset polyurethane was modified by using equivalents of the isocyanate, diol and triol in the ratio 5:1:4. The resulting thermoset polyurethane ply had the following properties:

Shore hardness at 23° C. : 81D
Heat distortion temperature at 264 lbs loading (ASTM 648) : 48° C.
Taber abrasion. Change in haze after 100 cycles (ASTM D1044)
at 23° C. : <12%
at 50° C. : <3%
Sheen scratch test. Time to recover with 1000 g loading on stylus (British Standard 3900E2)
at 23° C. : 72 hours
at 50° C. : <5 minutes and an average molecular weight between branch points of 700.

Again the window produced was found to be flat and easily mounted in a testing fixture. It withstood the ball drop test and attack with a hammer in the same way as the window produced in Example 1.

As will be apparent to the skilled man, the windows of the present invention are intended for use with the glass pane on the outside, the direction of expected impact. The thermoset polyurethane on the inside has a hard surface "feel", similar to that of acrylic and polycarbonate panes, but has the advantage of being "self-healing". Moreover, the rigid thermoset ply, like a corresponding acrylic or polycarbonate ply, provides significant protection to the thermoplastic interlayer against impacts which might "press through" the outer ply. However, since the thermoset polyurethane has a lower heat deflection temperature than acrylic or polycarbonate, windows produced by laminating it to a glass ply with a thermoplastic interlayer are less susceptible to warping or other thermal distortion as the thickness ratio of the glass and plastics outer plies approaches 1:1.

What is claimed is:

1. A lightweight anti vandal impact resistant window comprising a laminate of a glass ply, a ply of thermoset polyurethane having a thickness of at least 1.0 mm, a Shore hardness of at least 75D and an average molecular weight between branch points in the range of 500 to 1000, and an energy absorbing plastics interlayer bonded between the glass ply and the thermoset polyurethane ply, said energy absorbing plastics interlayer having a thickness of at least 1.25 mm.

2. A lightweight impact resistant window according to claim 1 wherein the energy absorbing plastics interlayer is of thermoplastic polyurethane.

3. A lightweight impact resistant window according to claim 2 wherein the thermoplastic polyurethane is an aliphatic polyurethane.

4. A lightweight impact resistant window according to claim 1, wherein the interlayer has a thickness up to 6 mm.

5. A lightweight impact resistant window according to claim 1, wherein the thermoset polyurethane has a Shore hardness of at least 78D.

6. A lightweight impact resistant window according to claim 1, wherein the thermoset polyurethane has a Shore hardness of up to 90D.

7. A lightweight impact resistant window according to claim 1, wherein the thermoset polyurethane has a heat deflection temperature below 60° C.

8. A lightweight impact resistant window according to claim 1, wherein the thermoset polyurethane is derived from a cycloaliphatic diisocyanate, a polycaprolactone diol and polycaprolactone triol.

9. A lightweight impact resistant window according to claim 8 wherein the cycloaliphatic diisocyanate is 4,4' methylene-bis (cyclohexylisocyanate).

10. A lightweight impact resistant window according to claim 8 wherein the polycaprolactone diol has an average molecular weight in the range from about 500 to about 700.

11. A lightweight impact resistant window according to claim 8 wherein the polycaprolactone triol has an average molecular weight in the range from about 250 to about 400.

12. A lightweight impact resistant window according to claim 1, wherein the thermoset polyurethane ply has a thickness in the range 1 mm to 2.5 mm.

13. A lightweight impact resistant window according to claim 1, wherein the glass ply has a thickness in the range 2 mm to 4 mm.

14. A lightweight impact resistant window according to claim 13, wherein the glass ply is of annealed glass, the energy absorbing plastics interlayer has a thickness in the range of 1.25 mm to 3 mm, and the thermoset polyurethane ply has a thickness in the range 1.0 mm to 2.5 mm.

* * * * *